United States Patent
Imai et al.

(10) Patent No.: US 6,588,937 B2
(45) Date of Patent: Jul. 8, 2003

(54) OPTICAL COUPLING DEVICE FOR EASING STRESS WORKING ON OPTICAL FIBER

(75) Inventors: Seisaku Imai, Miyagi-ken (JP); Mikio Oka, Miyagi-ken (JP); Masashi Katoh, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/112,158

(22) Filed: Mar. 27, 2002

(65) Prior Publication Data

US 2002/0150345 A1 Oct. 17, 2002

(30) Foreign Application Priority Data

Apr. 12, 2001 (JP) .......................................... 2001-114324

(51) Int. Cl.⁷ ................................................. G02B 6/36
(52) U.S. Cl. ............................. 385/53; 385/60; 385/72
(58) Field of Search ............................. 385/53, 55, 60, 385/45, 90, 72, 139; 439/247, 248

(56) References Cited

U.S. PATENT DOCUMENTS

| | | | | |
|---|---|---|---|---|
| 4,808,115 A | * | 2/1989 | Norton et al. | ................. 439/79 |
| 4,894,630 A | * | 1/1990 | Ueta et al. | ................... 333/185 |
| 4,952,798 A | * | 8/1990 | Graham et al. | ........ 250/227.11 |
| 5,953,474 A | * | 9/1999 | Basavanhally | ............... 385/60 |
| 5,993,071 A | | 11/1999 | Hultermans | .................. 385/70 |

* cited by examiner

Primary Examiner—Neil Abrams
Assistant Examiner—Hae Moon Hyeon
(74) Attorney, Agent, or Firm—Beyer Weaver & Thomas, LLP (57) ABSTRACT

When a plug is to be fitted to a first connector from one side and a plug is to be fitted to a second connector from the other side of an optical coupling device, the first connector and the second connector shift in an X direction to ease stresses working on an internal optical fiber. Therefore, stresses working on the optical fiber can be eased without having to extend a length of the internal fiber, and accordingly it is made possible to reduce an overall size of the optical coupling device.

6 Claims, 7 Drawing Sheets

OPTICAL COUPLING DEVICE FOR EASING STRESS WORKING ON OPTICAL FIBER

BACKGROUND OF THE INVENTION

1. Field of the Invention

The present invention relates to an optical coupling device for separating and assembling optical signals by using a branched type optical fiber arranged in a case, and more particularly to an optical coupling device for easing optical stress working on the optical fiber.

2. Description of the Prior Art

FIG. 7 shows a plan of an example of optical coupling device according to the prior art.

Figure 7:
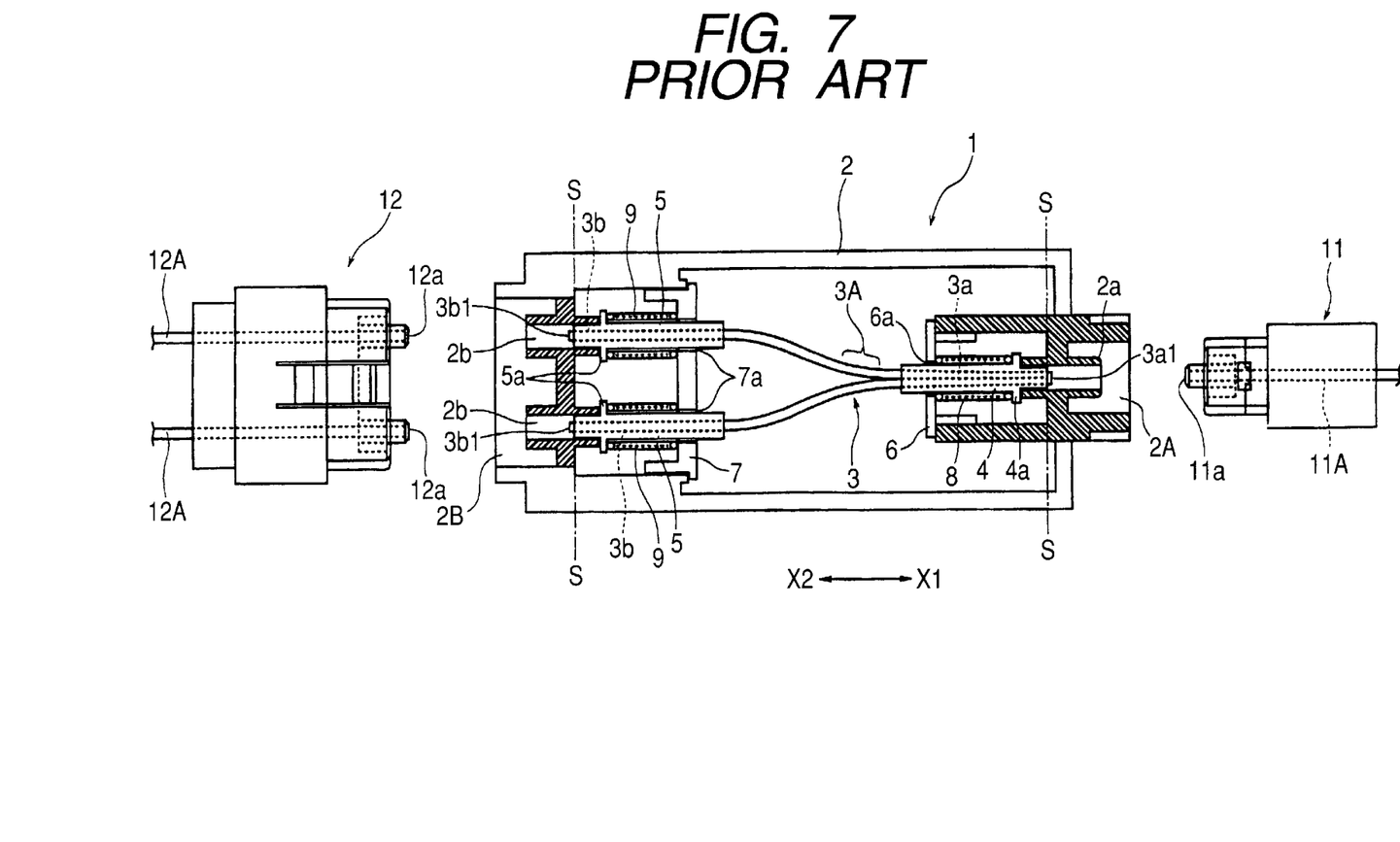
FIG. 7 shows a plan of an example of optical coupling device according to the prior art.

In the optical coupling device according to the prior art shown in FIG. 7, a plurality of optical fibers are bundled on one end side, and mounted as an internal fiber.

The internal fiber is formed by bundling a plurality of optical fibers on one end side in a state in which the diameters of individual optical fibers are made gradually thinner to equalize the diameters of their end faces to those of an optical fiber to be connected thereto. When optical signals are transmitted from a first end face side of the bundled end of the optical fiber, it is possible at a second end side of the branched optical fibers to separate the optical signals and to let each fiber receive the same optical signals. Or when optical signals are transmitted from at the second end side of the branched optical fibers, it is possible on the first bundled end side to assemble and receive the optical signals.

An optical coupling device 1 shown in FIG. 7 is intended for connection of a plug 11 for use with an F05 type single-core optical fiber connector conforming to Japanese Industrial Standards (JIS)-C-5974 and a plug 12 for use with an F07 type two-core optical fiber connector conforming to JIS-C-5976. In the case 2 of the optical coupling device 1, there are provided a bundled end 3a formed by bundling one end (end on the X1 side in the drawing) of each of two optical fibers and a 1-to-2 branched internal fiber 3 formed by integrating branched ends 3b and 3b formed by branching the other ends of the fibers.

At the one bundled end 3a of the internal fiber 3 is provided a ferrule (holding member) 4, and at the branched ends 3b are provided ferrules (holding member) 5. The ends of the internal fiber 3 are firmly fixed to the ferrules 4 and 5 with an adhesive. The tips of the bundled end 3a and the branched end 3b are fitted in a state in which they barely protrude out of the case 2 from the tips of the ferrules 4 and 5, respectively, and these protruding portions constitute stubs 3a1 and 3b1.

The case 2 is made of synthetic resin. On one end face of the case 2 in the X direction in the drawing is formed a connecting part (connector) 2A, protruding in the X1 direction in the drawing, for connecting the F05 type plug 11, and on the end face is formed a connecting part 2B, protruding in the X2 direction in the drawing, for connecting the F07 type plug 12. To the ends of the connecting parts 2A and 2B of the case are fitted caps 6 and 7. In the caps 6 and 7 are formed through holes 6a, 7a and 7a, respectively.

Tubular sleeve holders 2a, 2b and 2b are formed in the X1-X2 direction in the drawing integrally with the connecting parts 2A and 2B, respectively. Between the inward ends of these sleeve holders 2a and 2b and the caps 6 and 7 are respectively provided the ferrules 4 and 5, respectively, fitted to ends of the internal fiber 3.

On the outer faces of the ferrules 4 and 5 are formed flanges 4a and 5a extending the direction of the external circumference. Between the flanges 4a and 5a on the one hand and the caps 6 and 7 on the other are respectively provided cylindrical coil springs 8, 9 and 9. Therefore, the ferrules 4 and 5 are held within the case 2 in a state in which the inward ends of the sleeve holder 2a and the sleeve holders 2b are pressed in the outward direction by the coil springs 8 and 9. The tips of the ferrules 4 and 5 are set on an optical reference plane S—S represented by a one-dot chain line in the drawing, and the stubs 3a1 and 3b1 protrude outward from the optical reference plane S—S.

In the optical coupling device 1, when the F05 type plug 11 is connected to one connecting part 2A, an end face 11a of an optical fiber 11A of the F05 type plug 11 presses an end face of the bundled end 3a in the optical coupling device 1 in a direction toward inside the case 2, with the result that the coil spring 8 is compressed, and the end face of the stub 3a1 is returned to the optical reference plane S—S. When the F07 type plug 12 is connected to the other connecting part 2B, end faces 12a and 12a of one optical fiber 12A of the F07 type plug 12 press end faces of the branched ends 3b and 3b. Therefore, the coil springs 9 and 9 are compressed in the direction of X1 in the drawing, end faces of the stubs 3b1 and 3b1 are returned to the optical reference plane S—S.

Thus, when the plug 11 and the plug 12 are fitted, the end face 11a of the optical fiber 11A of the plug 11 presses the end face of the bundled end 3a inward (in the X2 direction), and the end faces 12a and 12a of the optical fibers 12A and 12A of the plug 12 press the end faces of the branched end 3b and 3b of the internal fiber 3 inward (in the X1 direction). This brings both end faces of the optical fibers 11A, 12A and 12A and the end faces of the internal fiber 3 into tight contact with each other to reduce coupling losses of optical energy between the end faces.

However, the conventional optical coupling device 1 described above involves the problem that the connection of the plug 11 for use with the F05 type and of the plug 12 for use with the F07 type causes compressive stresses to work inward on the internal fiber 3 within the case 2 from both ends of the internal fiber 3, and as a result excessive stresses tend to concentrate on the branching portion 3A of the internal fiber 3.

Regarding this problem, the compressive stresses working on the internal fiber 3 can be reduced, and the concentration of stress on the branching portion 3A eased, by increasing the overall length of the internal fiber 3.

However, a greater overall length of the internal fiber 3 means a correspondingly greater overall length of the case 2, which makes it impossible to reduce the size of the optical coupling device 1.

SUMMARY OF THE INVENTION

The present invention, attempted to solve the above-noted problems with the prior art, is to provide an optical coupling device permitting alleviation of compressive stresses which would otherwise tend to concentrate on the branching portion of the internal fiber.

Another object of the invention is to provide an optical coupling device permitting a reduction in the overall length of the internal fiber and accordingly in the overall size of the device.

According to the present invention, there is provided an optical coupling device provided in its case with an internal fiber, holding members for holding each of two ends of the internal fiber, first and second connectors each holding one or the other of the holding members shiftably in an axial direction of the internal fiber, and energizing means each energizing, within one or the other connector, the holding member toward a connecting part of the connector, wherein each of the connecting parts of the first and second connectors permits fitting of a plug for holding an external fiber, each connector has within the case a margin of shifting at least toward outside the case, the plug is fitted to the connecting part of the first connector, and the second connector can shift toward outside the case when the first connector is at a limit of inward shifting and a holding member pressed by the plug shifts inward in the case.

Further, when a plug is fitted to the connecting part of the second connector, the second connector reaches a position of shifting limit inward in the case and, when the holding member in the second connector is pressed by the plug to shift inward in the case, the first connector can shift toward outside the case.

Since according to the invention, when plugs are fitted to connectors at the two ends of the optical coupling device, shifting of both connectors together can let compressive stressed generated by energizing members escape, stresses working on the internal fiber can be eased.

In the foregoing configuration, in a state in which plugs are fitted to the first connector and the second connector, the holding member in each of the connectors is shifting inward in the case against an energizing force of the energizing means, and it is preferable for the internal fiber and the external fiber to be pressed by the energizing force.

In the foregoing configuration, since it is possible to adhere closely to each other the end face of the internal fiber and the end face of the optical fiber to be connected thereto, optical signals can be transmitted reliably, and the coupling loss between the optical fibers can also be reduced.

It is preferable that, in the first and second connectors, both of the first connector and second connector can be shifted toward the outside of the case by 2×δ when the plugs are not fitted, where δ is a quantity of shift of the holding members inward in the case when the plugs are fitted.

It is further preferable that, in a state in which no plug is fitted to either of the connectors, the first connector and second connector are in their respective positions of limit of shifting inward in the case.

In the foregoing configuration, in a state in which plugs are fitted to both connectors, the internal fiber is in a state of free length, and no compressive force works on the internal fiber, and accordingly stresses working on the internal fiber can be eased.

It is also possible to reduce the plays of the two connectors in the case.

Further according to the invention, one of the first and second connectors may be provided with one holding member, a plurality of holding members being provided in the other connector, and the one holding member and the plurality of holding members being connected by the internal fiber to make possible optical separation and optical assembly.

DETAILED DESCRIPTION OF THE PREFERRED EMBODIMENT

The present invention will be described in detail below with reference to accompanying drawings.

Figure 1:
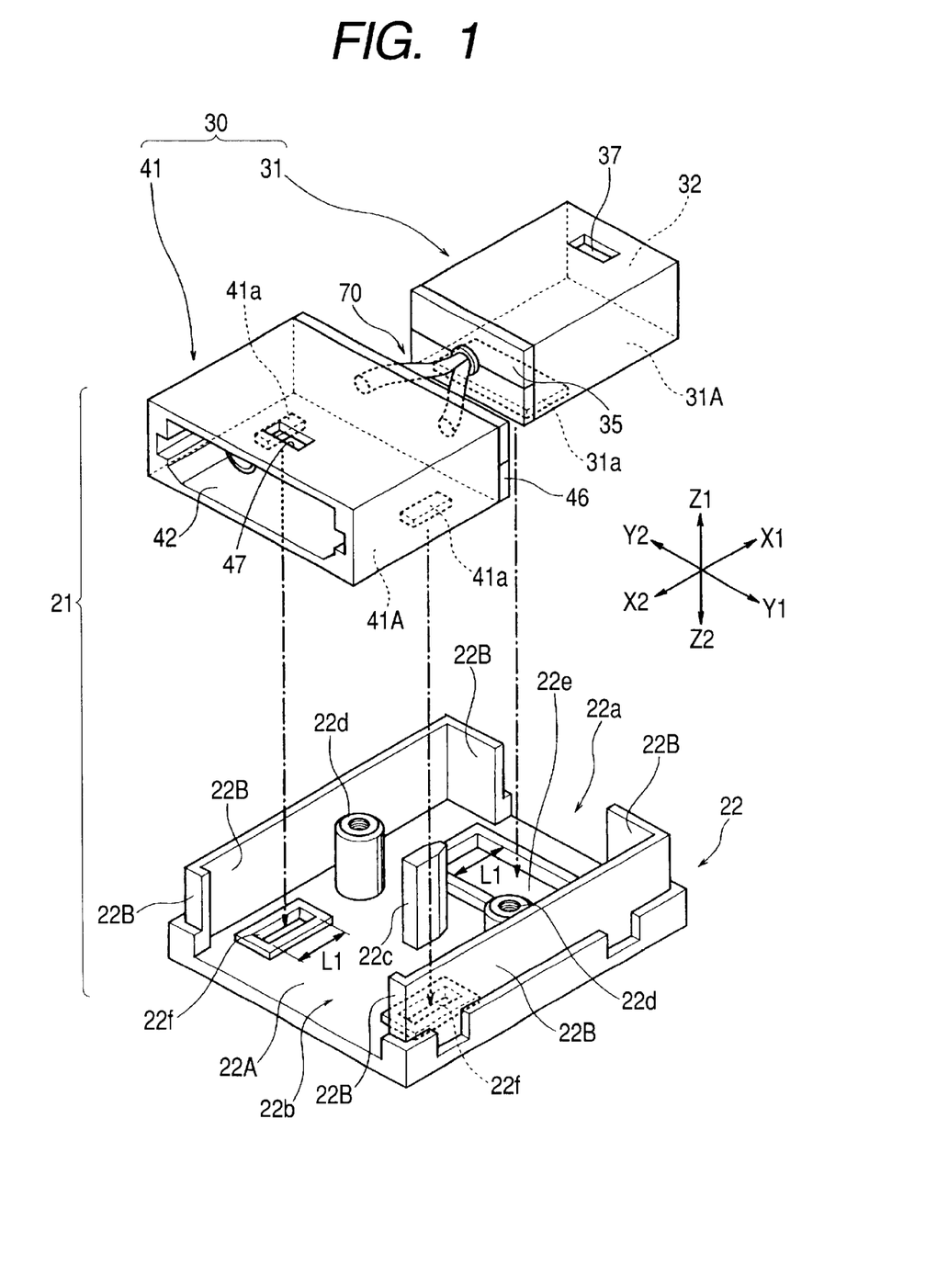
FIG. 1 shows a perspective view of an optical coupling device according to the present invention.
Figure 2:
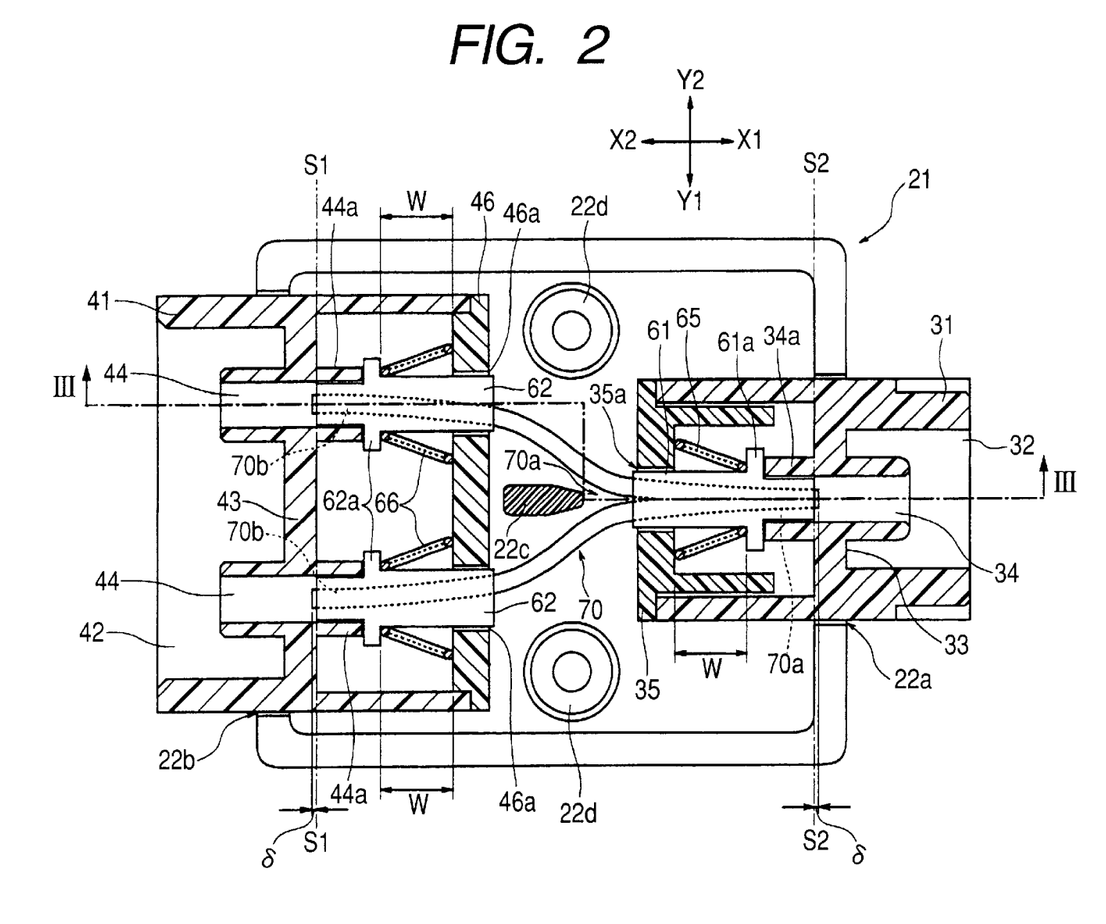
FIG. 2 shows a plan of the optical coupling device shown in FIG. 1 in a state wherein no plug is connected.
Figure 3:
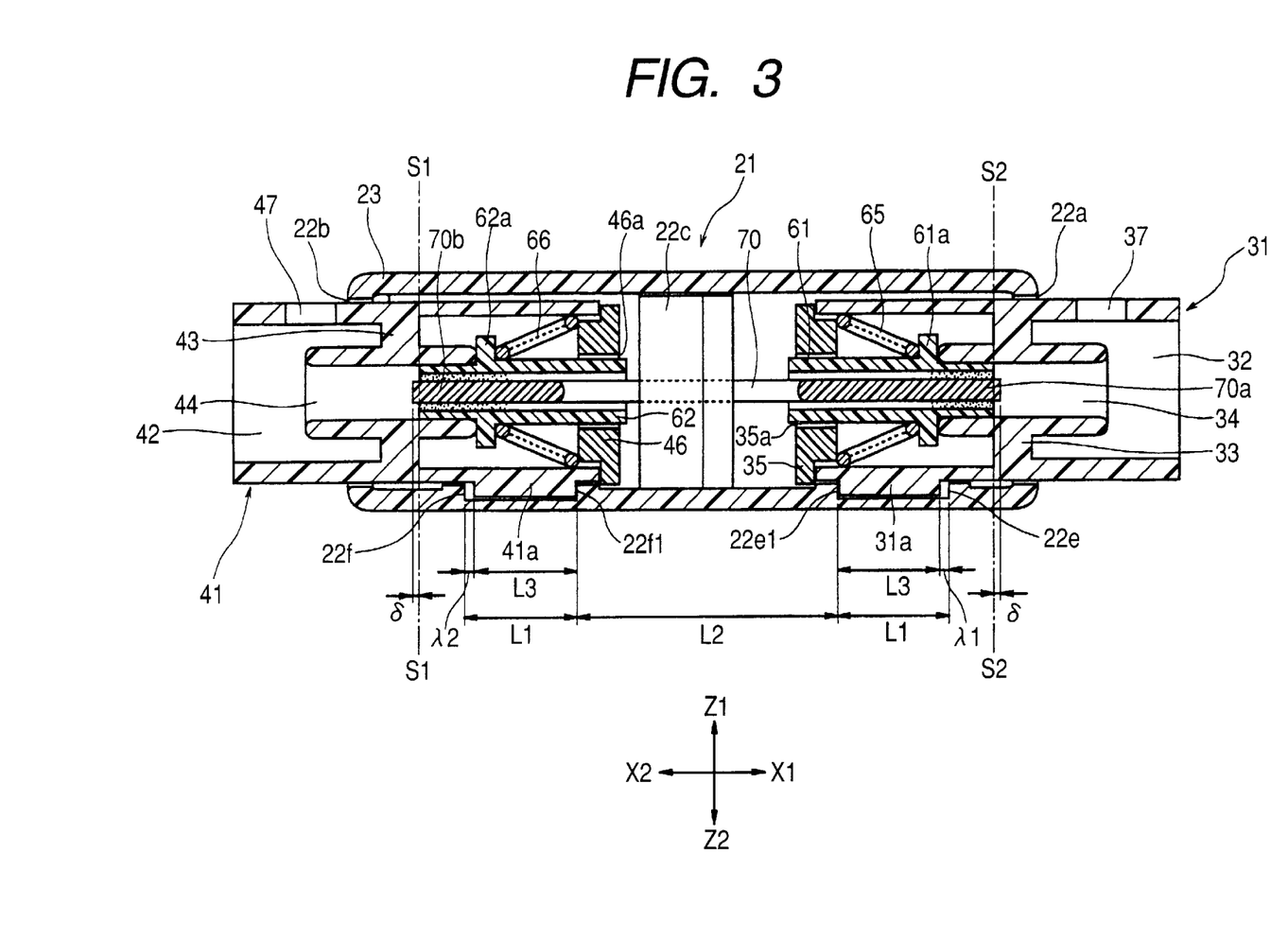
FIG. 3 is an arrow diagram showing a sectional view along line III—III in FIG. 2.
Figure 4:
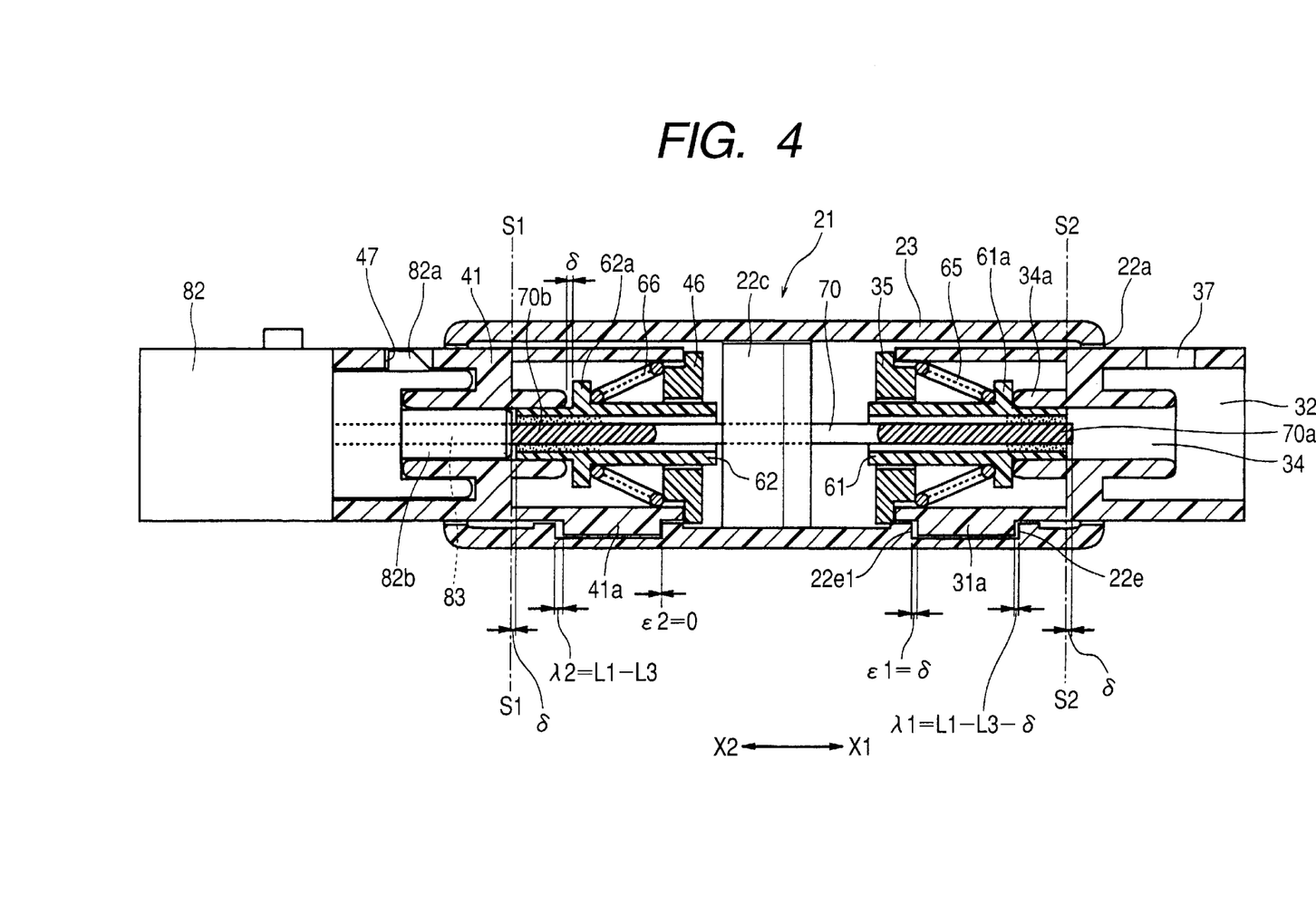
FIG. 4 is a sectional view of the optical coupling device in a state wherein a plug is connected to one connector.

FIG. 1 shows a perspective view of an optical coupling device according to the invention; FIG. 2, a plan of the optical coupling device shown in FIG. 1 in a state wherein no plug is connected; FIG. 3, an arrow diagram showing a sectional view along line III—III in FIG. 2; FIG. 4, a sectional view of the optical coupling device in a state wherein a plug is connected to one connector; and FIG. 5, a sectional view showing a process of connecting a plug to the other connector in the state shown in FIG. 4; and FIG. 6, a sectional view showing a state in which a plug is locked to the other connector.

An optical coupling device 21 shown in FIG. 1 and FIG. 2 comprises a case assembly consisting of a case body 22 and a case lid 23, and a connecting member 30 consisting of a female first connector 31, a female second connector 41 and internal fiber 70 connecting them. It is to be noted, however, that the case lid 23 is shown in FIG. 3, and its illustration is dispensed with in FIG. 1.

The case body 22, the case lid 23 and first and second connectors 31 and 41 are made of synthetic resin. The case body 22 is shaped as a substantially square box, consisting of a bottom 22A and side walls 22B surrounding it, and rectangular openings 22a and 22b are formed in the direction of X1-X2 in the drawing (the plugging/unplugging direction) in part of the side walls 22B. At the center of the bottom 22A is formed a support 22c, and toward two edges of the bottom 2A, in the Y1-Y2 direction in the drawing, are formed bolt receptacles 22d and 22d, each consisting of a columnar support threaded inside. The case lid 23 shown in FIG. 3 through FIG. 6, in a state in which it covers the case body 22, it is fixed by screwing bolts inserted from outside into the bolt receptacles 22d and 22d.

On the other hand, the part of the bottom 22A between one opening 22a and the support 22c is formed a first guide groove 22e surrounded by a rectangular rib. The part of the bottom 22A between the other opening 22b and the support 22c are formed second guide grooves 22f and 22f consisting of rectangularly shaped ribs. Both the first guide groove 22e and the second guide grooves 22f and 22f are set to L1 in length in the X direction. The distanced between the inner edge (position of the shifting limit) 22e1 of the first guide groove 22e and the inner edged (positions of the shifting limit) 22f1 of the second guide grooved 22f are set to L2.

The first and second connectors 31 and 41 are box-shaped. On the bottom 22A of the first connector 31 is formed a rectangular regulating portion (first regulating portion) 31a to fit into the first guide groove 22e. Similarly, on the bottom 41A of the second connector 41 is formed rectangular regulating portions (second regulating portions) 41a and 41a to fit into the second guide grooves 22f and 22f. Both the regulating portion 31a and the regulating portions 41a are set to L3 in length in the X direction, though the length L3 of the regulating portion 31a and the regulating portions 41a is set to be shorter than the length L1 of the first guide groove 22e and the second guide grooves 22f in the X direction (L1>L3). Therefore, the regulating portion 31a and the regulating portions 41a have margins for shifting in the first guide groove 22e and the second guide grooves 22f at least corresponding to that difference (L1–L3).

The distance between the inner edge of the regulating portion 31a and those of the regulating portions 41a in a state in which the internal fibers 70 is laid is set to be equal to the distances L2 between the inner edge (position of the shifting limit) 22e1 of the first guide groove 22e and the inner edged (positions of the shifting limit) 22f1 of the second guide grooves 22f. Therefore, the first and second connectors 31 and 41 have sufficient margins for shifting at least toward outside the case body 22.

The first connector 31 is provided with a connecting part (receptacle) 32 to which a plug for use with an F05 type single-core optical fiber connector conforming with JIS-C-5974 is to be fitted. On the other hand, the second connector 41 is provided with a connecting part (receptacle) 42 to which a plug for use with an F07 type two-core optical fiber connector conforming with JISC-5976 is to be fitted. Incidentally on the top faces of the first and second connectors 31 and 41 are respectively formed hooking holes 37 and 47 with which lock claws provided on the plugs are to engage.

As shown in FIG. 2 and FIG. 3, a partition plate 33 is formed at the center of the first connector 31, and at the center of this partition plate 33 is formed a tubular sleeve holder 34 having a through hole within and extending in the X direction in the drawing. To an end of the inside of the first connector 31 (toward X2 in the drawing) is fitted a detachable cap 35, at the center of which is formed a hole 35a through which a ferrule (holding member) is to be passed.

Similarly, at the center of the second connector 41 is formed a partition plate 43, which is provided with tubular sleeve holders 44 and 44 arranged in parallel, and each of these sleeve holders has a through hole inside and extending in the X direction in the drawing. To an end of the inside of the second connector 41 (toward X1 in the drawing) is fitted a detachable cap 46, at the center of which are formed holes 46a and 46a through each of which a ferrule (holding member) is to be passed.

To add, as shown in FIG. 1, each of the caps 35 and 46 can be bisected in the middle into upper and lower portions (Z1 and Z2), and it is preferable, when the two ends of the internal fiber 70 are connected to the first connector 31 and the second connector 41, to fit them integrally.

As illustrated in FIG. 2, a ferrule (holding member) 61 is provided between the partition plate 33 and the cap 35. The ferrule 61 is cylindrically shaped, and on its outer face is formed a flange 61a extending toward the outer circumference. A tip of ferrule 61, farther out (X1 in the drawing) than the flange 61a, is inserted into the through hole of the sleeve holders 34, and the inner (X2 in the drawing) tip of the ferrule 61 is passed into the hole 35a of the cap 35.

On the other hand, cylindrical ferrules (holding members) 62 and 62 are also provided between the partition plate 43 and the cap 46. On the outer face of each ferrule 62 is formed a flange 62a extending toward the outer circumference, and a tip of each ferrule 62 farther out (X1 in the drawing) than the flange 62a is inserted into the through hole of the sleeve holders 44. The inner (X2 in the drawing) tip of the ferrule 62 is passed into the hole 46a of the cap 46.

In the first connector 31, between the flange 61a of the ferrule 61 and the cap 35, there is provided, in a compressed state, a conic coil spring as an energizing member 65, which presses the flange 61a of the ferrule 61 against an end 34a of the sleeve holder 34.

Similarly, in the second connector 41, a conic coil spring as an energizing member 66, which presses the flange 62a of each ferrule 62 against an end 44a of the sleeve holder 44 is provided, in a compressed state, between the flange 62a of the ferrule 62 and the cap 46, and the flange 62a of each ferrule 62 is presses against an end 44a of one or the other of the sleeve holders 44. The tips of both the ferrule 61 and of the ferrules 62 in this state coincide with optical reference planes S1 and S2 in the X direction.

The energizing members 65 and 66 are conic coil springs, whose diameters are smaller on the side they come into contact with the flange of the matching ferrule and greater on the side they come into contact with the caps 35 and 46 on the first and second connectors 31 and 41, respectively.

To add, in the first and second connectors 31 and 41, because conic coil springs are used as the energizing members 65 and 66, the length W required for compression in the X direction in the drawing can be shorter than where cylindrical coil springs are used according to the prior art. It is therefore made possible to reduce the overall size of the optical coupling device 21.

The internal fiber 70 is provided between the ferrule 61 and the ferrules 62. The internal fiber 70 is a 1-to-2 branched optical fiber as in the above-described configuration according to the prior art. Their one end (on the X side in the drawing) is a bundled end 70a formed on each side in a semicircular section and joined to form a full circular section. The diameter of the bundled end 70a is equalized to that of the end face of an optical fiber 87 held in a ferrule 81b of a plug 81 to be described afterwards. The other ends are branched ends 70b branched out from the branching portion 70A. The internal fiber 70 is an optical fiber whose core, consisting of quartz or polymethyl methacrylate (PMMA), is exposed, or an optical fiber the external circumferences of whose core is covered with cladding composed of fluoroplastics or the like.

The bundled end 70a of the internal fiber 70 is passed into the ferrule 61, and its tip is fixed to the ferrule 61 with an adhesive in a state it barely protrudes outward (in the X1 direction) from the tip of the ferrule 61. The other branched ends 70b are also passed into the ferrules 62, and their tips are fixed to the ferrules 62 with an adhesive in a state they barely protrude outward (in the X2 direction) from the tips of the ferrules 62. Incidentally, both the bundled end 70a and the branched ends 70b protrude by δ, which is the quantity of outward protrusion from the optical reference planes S1 and S2.

The optical coupling device 21 described above is assembled by loading into the case body 22 the connecting member 30 in which the first connector 31 and the second connector 41 are linked by the internal fiber 70 and covering the member with the case lid 23 from above. In this assembling process, the regulating portion 31a of the first connector 31 is shiftably accommodated in the first guide groove 22e of the case body 22, and the regulating portions 41a and 41a of the second connector 41 are shiftably accommodated in the second guide grooves 22f and 22f of the case body.

The operation of the optical coupling device will be described below.

(Initial State)

As shown in FIG. 2 and FIG. 3, in the initial state after the completion of assembling, both the distances between the inner edge 22e1 of the first guide groove 22e and the inner edges 22f1 of the second guide grooves 22f of the case body 22 and those between the inner edge of the regulating portion 31a of the first connector 31 and the inner edges of the regulating portions 41a of the second connector 41 are L2. Therefore, both the inner edge of the regulating portion 31a and the inner edges of the regulating portions 41a are set to the inner edge (position of the shifting limit) 22e1 of the first guide groove 22e and the inner edges (positions of the shifting limit) 22f1 of the second guide grooves 22f. Then, between the outer edge of the regulating portion 31a and the outer edge of the first guide groove 22e is formed a clearance λ1, and between the outer edges of the regulating portions 41a and the outer edge of the first guide grooves 22f are formed clearances λ2. Between the clearances λ1 and λ2 there is a relationship of λ1=λ2=(L1-L3).

(When a Plug for use with the F07 Type Two-Core Optical Fiber Connector is Fitted)

As shown in FIG. 4, when a plug 82 for use with the F07 type two-core optical fiber connector is fitted to the connecting part 42 of the second connector 41, a lock claw 82a provided on the plug 82 engages with the hooking hole 47 of the second connector 41. This causes the plug 82 to be locked to the second connector 41.

In this process, the end face of an optical fiber 83 in a ferrule 82b of the plug 82 is pressed to a position where it coincides with the optical reference plane S1—S1. As a result, the end face of the optical fiber 83 hits against the end faces of the branched ends 70b of the internal fiber 70, and then presses the branched ends 70b inward (in the X1 direction in the drawing). As this causes the ferrules 62 holding the branched ends 70b of the internal fiber 70 to be pressed in the X1 direction in the drawing and the energizing member 66 to be compressed, the ferrules 62 are shifted into the case body 22 (in the X1 direction in the drawing) against the energizing force of the energizing member 66. In this process, the quantity of shift of the ferrules 62 in the X1 direction is δ, and the internal fiber 70 is also shifted by δ in the X1 direction in the drawing along with the shift of the ferrules 62. To add, as the locking of the plug 82 to the second connector 41 can adhere the end faces of the branched ends 70b of the internal fiber 70 and the end faces of the optical fiber 83 closely to each other, the coupling loss between the optical fibers can be reduced.

On the other hand, in the first connector 31, when the internal fiber 70 shifts in the X1 direction in the drawing, the flange 61a of the ferrule 61 presses the end 34a of the sleeve holder 34 in the X1 direction, with the result that the whole first connector 31 is shifted in the X1 direction in the drawing to be set in the state shown in FIG. 4.

Thus, the first connector 31 shifts by δ in the X1 direction in the drawing. Therefore, a clearance (inner clearance) ε1 (ε1=ε) is formed between the inner edge of the regulating portion 31a and the inner edge 22e1 of the first guide groove 22e. As a result a clearance (outer clearance) λ1 between the outer edge of the regulating portion 31a and the outer edge of the first guide groove 22e is narrowed to λ1=(L1-L3)-ε1=(L1-L3-δ). (When a plug for use with the F05 type single-core optical fiber connector is fitted)

Next will be described the fitting of the plug 81 for use with the F05 type single-core optical fiber connector to the first connector 31 at the right hand end of the optical coupling device 21 in the drawing from the right hand end in the drawing.

Figure 5:
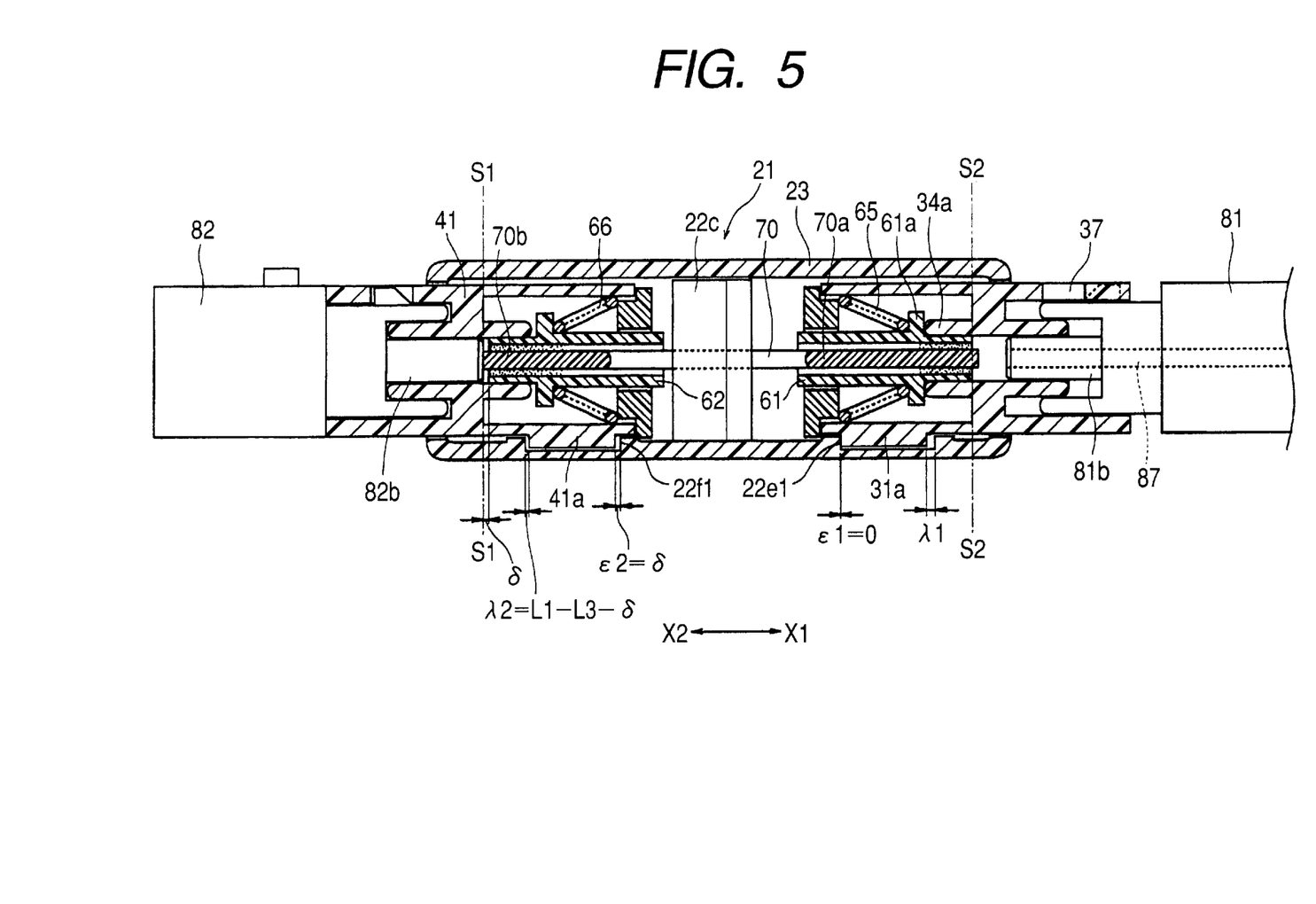
FIG. 5 is a sectional view showing a process of connecting a plug to the other connector in the state shown in FIG. 4.

As shown in FIG. 5, when the plug 81 is fitted to the connecting part 32 of the first connector 31, as the connecting part 32 is pressed inward (in the X2 direction in the drawing) by the plug 81, the first connector 31 is shifted inward and the inner edge of the regulating portion 31a comes into contact with the inner edge 22e1 of the first guide groove 22e. Thus, the first connector 31 is shifted inward by δ, and the inner clearance ε1 of the first connector 31 becomes ε1=0. Incidentally, the outer clearance λ1 of the first connector 31 is returned to λ1=(L1-L3).

At a midway stage of this fitting of the plug 81, as the internal fiber 70 shifts in the X2 direction in the drawing by δ, the second connector 41, with the plug 82 fitted to it, is also shifted in the X2 direction in the drawing by δ. Accordingly, clearances (inner clearances) ε2 (ε2=δ) are formed between the inner edges 22f1 of the second guide grooves 22f and the inner ends of the regulating portions 41a. Therefore, clearances (outer clearance) X2 between the outer edges of the second guide grooves 22f and the external edges of the regulating portions 41a are narrowed to λ2=(L1-L3-δ).

Figure 6:
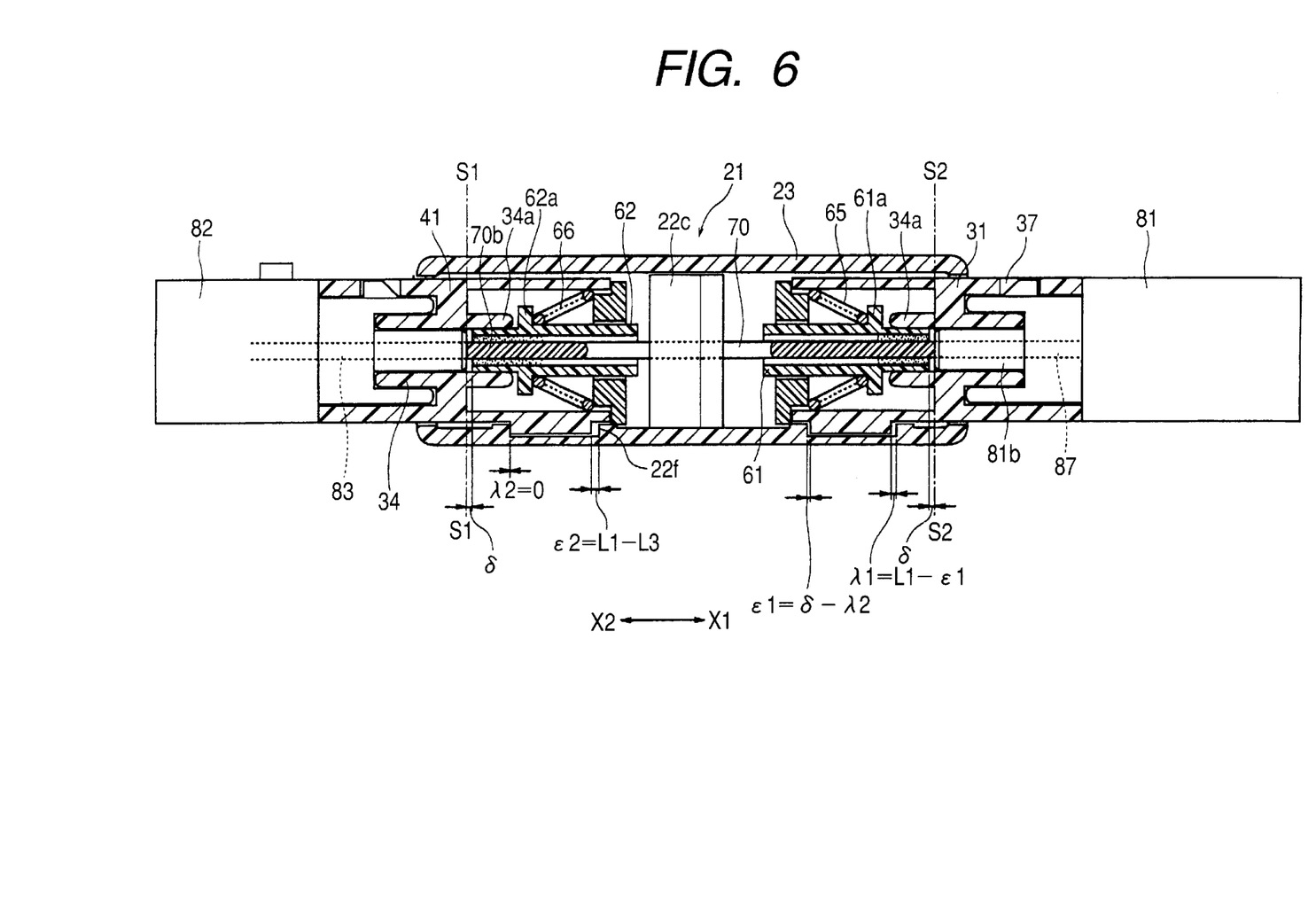
FIG. 6 is a sectional view showing a state in which a plug is locked to the other connector.

As shown in FIG. 6, when the lock claw of the plug 81 is locked to the hooking hole 37 of the first connector 31, the end face of the optical fiber 87 held in the ferrule 81b of the plug 81 is pressed to a position where it coincides with the optical reference plane S2—S2. Accordingly, the end face of the optical fiber 87 hit against the end face of the bundled end 70a of the internal fiber 70, and press the internal fiber 70 farther inward (in the X2 direction in the drawing). While this causes the ferrule 61 to be pressed in the X2 direction in the drawing, as the inner clearance ε1 of the first connector 31 is ε1=0 (see FIG. 5), the first connector 31 can shift no farther inward (in the X2 direction in the drawing) Accordingly, on the first connector 31 side, only the ferrule 61, instead of the first connector 31, shifts in the X2 direction in the drawing. Then, the energizing member 65 is compressed by the shifting of the ferrule 61, and the end face of the bundled end 70a of the internal fiber 70 is pressed inward (in the X2 direction) by δ, as much as it protrudes.

In this process, the ferrule 61 and the internal fiber 70 shift inward (in the X2 direction) by δ. As the end face of the bundled end 70a of the internal fiber 70 and the end face of the optical fiber 87 are then adhered closely to each other, the coupling loss between the optical fibers can be reduced.

On the other hand, in the second connector 41, the shift of the internal fiber 70 in the X2 direction in the drawing causes the whole second connector 41 fitted with the plug 82 to shift outward (in the X2 direction in the drawing) by δ.

Thus, when the plug 81 is fitted on the X1 side in the drawing in the state illustrated in FIG. 4, both the first and second connectors 31 and 41 shift by δ in the X2 direction in the drawing to reach the state shown in FIG. 5. Further, when the plug 81 is locked to the first connector 31, it is inserted until the end face of the optical fiber 87 coincides with the optical reference plane S2—S2, and the first and second connectors 31 and 41 are shifted by δ in the X2 direction in the drawing to reach the state shown in FIG. 6.

Then, there is the following difference with the relationship among the quantity of shift δ and clearances λ1 and λ2 in the initial state (see FIG. 3): whether the relationship is λ1=λ2<2×δ or it is λ1=λ2≧2×δ.

(1) Where the relationship is λ1=λ2<2×δ.

If, for instance, the quantity of protrusion δ is δ=0.3 mm and (L1-L3)=0.6 mm, in the initial state shown in FIG. 3, ε1=ε2=0 and λ1=λ2=(L1-L3)=0.5 mm. Then in the state in which the plug 82 is fitted as shown in FIG. 4, as only the first connector 31 shifts outward (in the X1 direction in the drawing), ε1=δ=0.3 mm, λ1=L1-L3-δ=0.2 mm, with ε2 and λ2 maintained as they are (ε2=0 and 12=0.5 mm).

Then in the state shown in FIG. 5, both the first and second connectors 31 and 41 shift by δ=0.3 mm in the X2 direction in the drawing with the result of $\epsilon1=0$, $\lambda1=0.5$ mm, $\epsilon2=0.3$ mm and $\lambda2=0.2$ mm.

In the state shown in FIG. 6, the moment the plug 81 is locked to the first connector 31, further the first connector 31 and the second connector 41 try to shift in the X2 direction in the drawing by $\delta=0.3$ mm, but the second connector 41 is limited in its shifting by $(\delta-\lambda2)=0.1$ mm because the outer end of the regulating portions 41a, when it has shifted outward (in the X2 direction in the drawing) by the clearance of $\lambda2=0.2$ mm, comes into contact with the outer edge of the second guide grooves 22f. At that time, an inward compressive force works on the internal fiber 70 to bring the bundled end 70a and the branched ends 70b closer to each other. Then, the internal fiber 70 can compensate for the uncompleted remainder of shift, $(\delta-\lambda2)=0.1$ mm, by flexing inward by 0.1 mm.

Therefore, the second connector 41 the X2 side in the drawing will eventually have an outer clearance $\lambda2$ of $\lambda2=0$ and an inner clearance $\epsilon2$ of $\epsilon2=(L1-L3)=0.5$ mm.

The compressive force of the internal fiber 70 arises between the ferrule 61 and the ferrules 62, and works to return the ferrule 61 in the X1 direction in the drawing. Thus, the flexure of the internal fiber 70 is generated only at the moment the plug 81 is locked to the first connector 31 to compress the energizing member 65, but after the locking the energizing member 65 is restored to its previous state to shift the ferrule 61 in the X1 direction in the drawing by the quantity of flexure, 0.1 mm, with the result that the internal fiber 70 returns to its pre-compression state and accordingly the compressive force can no longer work.

Therefore eventually, as shown in FIG. 6, the inner clearance $\epsilon1$ of the first connector 31 is set to $\epsilon1=(\delta-\lambda2)=0.1$ mm, and the external clearance $\lambda1$, to $\lambda1=(L1-\epsilon1)=0.4$ mm.

Incidentally, the plays of the first connector 31 and the second connector 41 in the X directions relative to the case body 22 after the linking of the connectors are 0.4 mm in the X1 direction and 0.1 mm in the X2 direction.

(2) Where the relationship is $\lambda1=\lambda2 \geqq 2 \times \delta$

If, for instance, the quantity of shift is $\delta=0.3$ mm and $(L1-L3)=0.6$ mm, in the initial state shown in FIG. 3 $\lambda1=\lambda2=(L1-L3)=0.6$ mm and $\epsilon1=\epsilon2=0$, and in the state shown FIG. 4, $\epsilon1=\delta=0.3$ mm, $\lambda1=L1-L3 -\delta=0.3$ mm, $\epsilon2=0$ and $\lambda2=L1-L3=0.6$ mm. In the state shown in FIG. 5, $\epsilon1=0$, $\lambda1=0.6$ mm, $\epsilon2=0.3$ mm and $\lambda2=0.3$ mm, and the quantity of flexure $(\delta-\lambda2)$ of the internal fiber 70, $(\delta-\lambda2)=0$. Therefore in FIG. 6, $\epsilon1=0$, $\lambda1=0.6$ mm, $\epsilon2=0.6$ mm and $\lambda2=0$.

Incidentally, the plays of the first connector 31 and the second connector 41 in the X directions relative to the case body 22 are 0.6 mm in the X1 direction and 0 in the X2 direction.

As described so far, in the case of (1) above, the quantity of flexure $(\delta-\lambda2)$ of the internal fiber 70 can be kept as small as 0.1 mm and, moreover, the internal fiber flexes only at the moment the plug 81 is locked to the first connector 31 and are released from the flexure after the locking, the stresses working on the internal fiber 70 can be minimized. Moreover, the plays of the first and second connectors 31 and 41 relative to the case body 22 can be reduced.

Further in the case of (2) above, as the quantity of flexure of the internal fiber 70 can be reduced to 0, no stress due to compressive force works on the internal fiber 70.

Furthermore, the is no need to disperse compressive stresses working on the internal fiber 70 by extending the length of the internal fiber 70. Therefore, it is made possible to reduce the overall length of the case body 22, i.e. the overall size of the optical coupling device 1.

While the foregoing description referred to a mode of implementing the invention in which the plug 81 for use with the F05 type is connected after connecting the plug 82 for use with the F07 type first, stresses on the internal fiber 70 can be similarly eased if the plug 81 for use with the F05 type is connected first followed by the connection of the plug 82 for use with the F07 type.

Although the foregoing description of the invention refers to an example in which the internal fiber 70 is a 1-to-2 branched optical fiber consisting of joining two fibers having a semicircular section into one having a full circular section, the invention is not limited to the use of such an internal fiber, and the internal fiber may be a 1-to-3 or 1-to-4 branched fiber for effective application of the invention.

Whereas the support 22c is formed at the center of the case body 22 in the above-described embodiment of the invention, this support 22c can support the case lid 23 from underneath and accordingly can reinforce the whole case body. It is preferable here for the support 22c to be formed in a position where it does not interfere with the shifting range of the internal fiber 70, and it can protect the branching portion 70A of the internal fiber 70 held in a state of being afloat from the bottom 22A in the case body 22.

Incidentally, where the internal fiber 70 is an optical fiber whose core is exposed, it is preferable for the case body including the support 22c to be black to have a light absorbing function so that light leaking the internal fiber 70 can be absorbed to reduce any effect of cross talk.

The present invention described in detail above makes it possible to ease stresses due to compressive force, which tends to work on the internal fiber within the case when a plug is fitted to a connector of an optical coupling device.

As the invention eliminates to extend the length of the internal fiber to ease such stresses, the overall size of the optical coupling device can be reduced.

What is claimed is:

1. An optical coupling device provided in its case with an internal fiber, holding members for holding each of two ends of the internal fiber, first and second connectors each holding one or the other of the holding members shiftably in an axial direction of the internal fiber, and energizing means each energizing, within one or the other connector, the holding member toward a connecting part of the connector, wherein each of the connecting parts of the first and second connectors permits fitting of a plug for holding an external fiber, wherein each connector has within the case a margin of shifting at least toward outside the case, wherein the plug is fitted to the connecting part of the first connector, and wherein the second connector can shift toward outside the case when the first connector is at a limit of inward shifting and a holding member pressed by the plug shifts inward in the case.

2. The optical coupling device according to claim 1, wherein, in a state in which a plug is fitted to the connecting part of the first connector, a plug is fitted to the connecting part of the second connector, wherein the second connector reaches a position of shifting limit inward in the case and, wherein when the holding member in the second connector is pressed by the plug to shift inward in the case, the first connector can shift toward outside the case.

3. The optical coupling device according to claim 2, wherein, in a state in which plugs are fitted to the first connector and the second connector, the holding member in each of the connectors is shifting inward in the case against an energizing force of the energizing means, and wherein the internal fiber and the external fiber are pressed by the energizing force.

4. The optical coupling device according to claim 3, wherein, in the first and second connectors, both of the first connector and second connector can be shifted toward the outside of the case by 2×δ when the plugs are not fitted, δ being a quantity of shift of the holding members inward in the case when the plugs are fitted.

5. The optical coupling device according to claim 4, wherein, in a state no plug is fitted to either of the connectors, the first connector and second connector are in their respective positions of limit of shifting inward in the case.

6. The optical coupling device according to claim 1, wherein one of the first and second connectors is provided with one holding member, wherein a plurality of holding members are provided in the other connector, and wherein the one holding member and the plurality of holding members are connected by the internal fiber to make possible optical separation and optical assembly.

* * * * *